United States Patent [19]

Füssl et al.

[11] 4,315,735
[45] Feb. 16, 1982

[54] PROCESS FOR CALCINING MINERAL RAW MATERIALS IN A UNIFLOW REGENERATIVE SHAFT FURNACE

[75] Inventors: Erwin Füssl, Zurich; Karl Scheibenreif, Adliswil, both of Switzerland

[73] Assignee: Maerz Ofenbau AG, Zurich, Switzerland

[21] Appl. No.: 87,308

[22] Filed: Oct. 22, 1979

[30] Foreign Application Priority Data

Dec. 29, 1978 [CH] Switzerland ................ 13294/78

[51] Int. Cl.$^3$ ................ C22B 26/20; F27D 3/22; F27D 23/00; C01F 11/06
[52] U.S. Cl. .................... 432/25; 423/175; 423/637; 432/79; 432/96
[58] Field of Search ............ 423/173, 175, 177, 637; 432/24, 25, 95, 96, 100, 79

[56] References Cited
U.S. PATENT DOCUMENTS

| | | | |
|---|---|---|---|
| 2,654,589 | 10/1953 | Somogyi | 432/79 |
| 3,003,756 | 10/1961 | Steffensen | 432/79 |
| 3,074,706 | 1/1963 | Schmid et al. | 432/99 |
| 3,761,567 | 9/1973 | Parsons | 423/175 |
| 3,771,946 | 11/1973 | Hofer et al. | 432/14 |

*Primary Examiner*—Gary P. Straub
*Attorney, Agent, or Firm*—Toren, McGeady and Stanger

[57] ABSTRACT

Either sulphur-containing raw materials or sulphur-containing fuels may be used in the calcination of mineral raw materials in a calcining furnace, with significant desulphurization of the calcined material being achieved if, on the one hand, cooling air introduced into the cooling zone of the furnace is removed at the upper end of the cooling zone thereof through exhaust ducts and if, on the other hand, the flue gases are free of oxygen and have a carbon monoxide content of 1 to 5% by volume. In order to obtain this composition of the flue gases, the combustion process can either be performed in the calcining zone of the calcining shaft of the furnace with a deficiency of air or a gaseous, liquid or solid fuel can be supplied by means of fuel tubes located at a transfer duct between the furnace shafts.

6 Claims, 2 Drawing Figures

PROCESS FOR CALCINING MINERAL RAW MATERIALS IN A UNIFLOW REGENERATIVE SHAFT FURNACE

BACKGROUND OF THE INVENTION

The invention relates to a process for calcining mineral raw materials, such as limestone, dolomite, or magnesite, in a uniflow regenerative shaft furnace having at least two shafts which are connected to each other through a transfer or annular duct with each shaft being alternately operated as the calcining or uniflow shaft and as the counterflow shaft, wherein the calcined raw material is cooled in cooling zones of both shafts.

For calcining mineral raw materials, a regenerative process described in U.S. Pat. No. 3,074,706 is known which is frequently used for the construction of uniflow/counterflow shaft furnaces having at least two shafts. This type of furnace is simple in its operation and, aside from a low energy consumption, it has the significant advantage of providing a good soft burning of the calcined raw material, while also being capable of producing medium and hard burning.

A large portion of the material produced in such uniflow/counterflow shaft furnaces is utilized in steel mills. For metallic and quality reasons, new and restricting requirements are imposed upon these steel mills. However, these can only be met when the materials used in the plants meet certain requirements. Among these is the requirement that the lime produced in the calcining furnaces have a very high degree of desulphurization, for example, about 90%.

Experiments have shown (Transactions AIME, volume 254, March 1973, pages 28–33) that it is possible to achieve a desulphurization of sulphur-containing limestone or to prevent an absorption of sulphur introduced with the fuel in the calcined lime, if a reducing atmosphere can be adjusted in the calcining zone of the furnace or in the calcining unit. For a given composition of the flue gases, in accordance with the thermal dynamic basic equations, the degree of desulphurization increases with increasing temperature in dependence upon the maximum partial pressure of the $SO_2$ generated in the flue gases during the desulphurization.

If this finding is to be utilized in the aforementioned uniflow/counterflow lime shaft furnace, it would be possible to adjust a reducing atmosphere in the calcining shaft of such a furnace by means of combustion with less than stoichiometric amounts. However, due to the fact that the cooling air is mixed with the flue gases coming from the calcining shaft and with $CO_2$ expelled from the limestone in the calcining shaft, an oxygen-containing atmosphere is obtained in the counterflow shaft. As a result of the equilibrium, this oxygen-containing atmosphere may again lead to a partial sulphurization of the calcined lime. Accordingly, it is not always possible to achieve the desired high degree of desulphurization.

The present invention proceeds from this state of the art and is directed toward development of a process of the type described above in such a manner that the flue gases generated in the uniflow or calcining shaft can be conveyed to the counterflow shaft without oxygen.

SUMMARY OF THE INVENTION

In accordance with the invention, the desired results are achieved by at least partially removing from the furnace the heated cooling air at the end of the cooling zone of each shaft and by conveying the flue gases from the uniflow shaft to the counterflow shaft with a carbon monoxide content of 1 to 5% by volume.

It has been suggested, with regard to the calcination of lime in uniflow regenerative shaft furnaces, to partially utilize, in the combustion process, the cooling air heated during cooling of the calcined lime. In this connection, reference is made to the magazine "Zement-Kalk-Gips" (cement-lime-gypsum) 1970, No. 6, pages 277–284. However, it has been found that with this measure, the required carbon monoxide content in the flue gases cannot be achieved.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWING

The invention shall be explained in an exemplified manner with the aid of two uniflow regenerative shaft furnaces which are schematically illustrated in the drawing.

In the drawing.

DETAILED DESCRIPTION OF THE PREFERRED EMBODIMENTS

Figure 2:
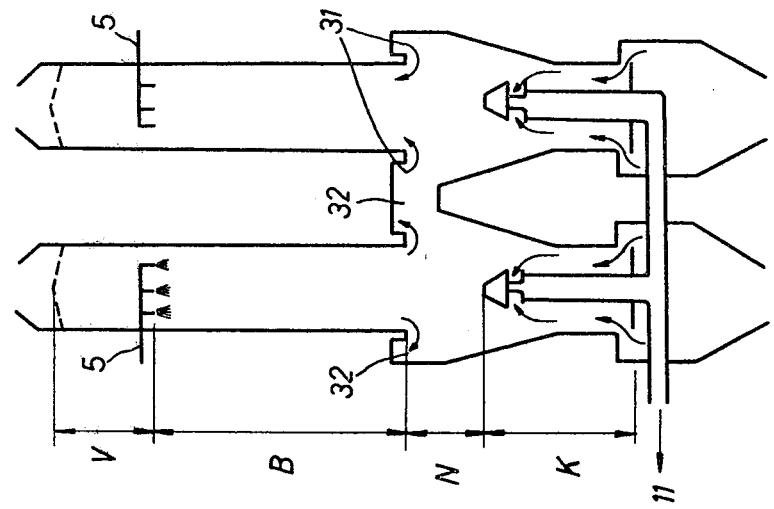
FIG. 2 is a section through another schematically illustrated uniflow regenerative shaft furnace.
Figure 1:
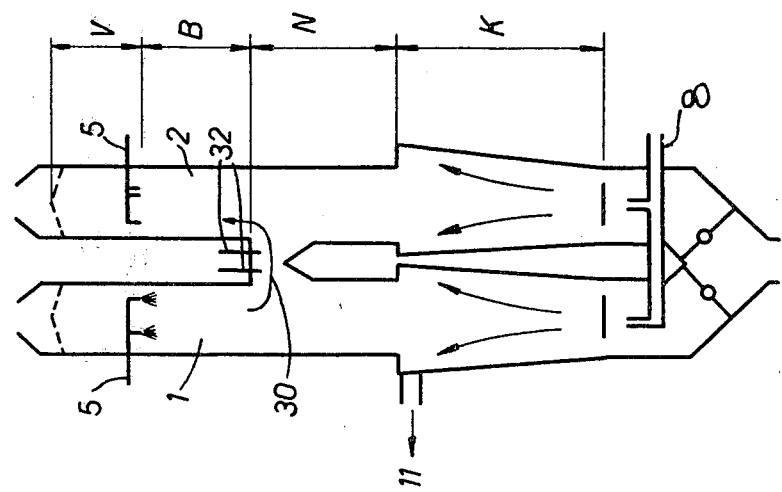
FIG. 1 is a section through a schematically illustrated uniflow regenerative shaft furnace.

The shaft furnaces which are schematically illustrated in FIGS. 1 and 2 have two shafts 1, 2. In the embodiment according to FIG. 1, these two shafts 1, 2 are connected to each other by means of a transfer duct 30 arranged at the end of a calcining zone B. In the embodiment according to FIG. 2, on the other hand, the calcining shafts 1, 2 are connected to each other by means of annular ducts 31.

The calcining zone B is followed by an after-deacidification zone N and, subsequently, by a cooling zone K. Above the calcining zone B, there is additionally provided a preheating zone V. Burners 5 are arranged between the preheating zone V and the calcining zone B.

A reducing atmosphere will be created if, for example, the shaft 1 is used as the uniflow or calcining shaft and if the burners 5 are operated with a deficiency of air. Simultaneously, the cooling air entering at the lower end of the cooling zone K through a line 8 is either entirely or partially removed at the upper end of the cooling zone K through exhaust ducts 11, so that flue gases flowing into the counter shaft are either totally devoid of, or only insignificantly enriched with, oxygen from the cooling air.

In the shaft furnace according to FIG. 2, the flue gases generated in the calcining shaft 1 flow into the counterflow shaft 2 through the annular ducts 31, with the cooling air entering the cooling zone K from below and being removed either entirely or partially through exhaust ducts 11, in a similar manner as in the arrangement according to FIG. 1.

In order to safely obtain a high degree of desulphurization in the operation of the furnace, it is essential, on the one hand, that the supply of oxygen into the counterflow shaft be prevented and that, on the other hand, the combustion be carried out with a deficiency of air, so that oxygen-free gases will be produced which have a carbon monoxide content of 1 to 5% by volume.

The aforementioned flue gas composition can also be obtained with a normal combustion of the fuel in the calcinating shaft by supplying a gaseous liquid or solid fuel in the transfer duct 30 between the shaft 1, 2 or in the annular duct 31 at the end of the calcining zone of the uniflow shaft, by means of one or more fuel tubes 32. As a result, the oxygen which may possibly be contained in the flue gases is (chemically) limited and the flue gases will contain carbon dioxide and nitrogen and 1 to 5% by volume carbon monoxide. This flue gas composition is prerequisite for preventing the sulphurization of the raw materials which are present in the counterflow shaft 2.

In addition to the combustion reaction of the raw materials, the process described also makes it possible to safely prevent a sulphurization of the raw materials. This does not have a significant negative influence on the operation of the shaft furnace and, therefore, the advantages of the shaft furnace are preserved, the important consideration being that sulphur-containing raw materials and/or sulphur-containing fuels can be utilized and that essentially desulphurized final products can nevertheless be obtained.

While specific embodiments of the invention have been shown and described in detail to illustrate the application of the inventive principles, it will be understood that the invention may be embodied otherwise without departing from such principles.

What is claimed is:

1. In a process for calcining raw materials, such as limestone, dolomite or magnesite, in a uniflow regenerative shaft furnace having at least two shafts alternately operated one as a calcining shaft and the other as a counterflow shaft, said shafts extending in a generally juxtaposed vertical orientation each defining a bottom with a cooling zone proximate said bottom wherein simultaneous cooling of calcined lime with cooling air is effected in said cooling zones of said shafts, said furnace including transfer duct means located above said cooling zones connecting said shafts in flow communication with each other, the improvement comprising that cooling air is introduced simultaneously at the bottom of both said shafts into said cooling zone, that heated cooling air is removed at the upper termination of said cooling zones from both shafts, that flue gases are conveyed from the one of said shafts operating as a calcining shaft to the other of said shafts operating as a counterflow shaft through said transfer duct means, and that the composition of the flue gases conveyed through said transfer duct means and the amount of cooling air removed from said cooling zones is such that a net reducing atmosphere is maintained throughout the counterflow shaft above the cooling zone.

2. The improvement according to claim 1 wherein said conveyed flue gases are produced in said calcining shaft by adjusting the combustion conditions therein to maintain less than stoichiometric proportions.

3. The improvement according to claim 1 wherein said conveyed flue gases are produced by burning fuel within said transfer duct means.

4. The improvement according to claim 3, wherein one of gaseous, liquid and solid fuel is supplied for the combustion in said transfer duct means.

5. The improvement according to claim 1 wherein said transfer duct means comprise annular ducts.

6. The improvement according to claim 1 wherein the carbon monoxide content of said conveyed flue gases is maintained between about 1 to 5 percent by volume.

* * * * *